Jan. 13, 1970  P. V. POPAT ET AL  3,489,609
LOW TEMPERATURE RECHARGEABLE BATTERY
Filed May 5, 1967  2 Sheets-Sheet 1

INVENTORS:
PRANJIVAN V. POPAT,
EDWARD J. RUBIN,
BY James P. McAndrews,
ATT'Y.

United States Patent Office 3,489,609
Patented Jan. 13, 1970

3,489,609
LOW TEMPERATURE RECHARGEABLE BATTERY
Pranjivan V. Popat, Attleboro, and Edward J. Rubin, Sharon, Mass., assignors to Texas Instruments Incorporated, Dallas, Tex., a corporation of Delaware
Filed May 5, 1967, Ser. No. 636,426
Int. Cl. H01m 43/04, 35/02; C23b 11/02
U.S. Cl. 136—6
9 Claims

ABSTRACT OF THE DISCLOSURE

A sealed battery is shown to incorporate a negative electrode which comprises a foraminous, electrically-conductive, cadmium or cadmium plated substrate having electrochemically active cadmium hydroxide particles secured to the substrate for permitting charging of the battery at low temperatures on the order of −40° C.

---

Conventional sealed batteries having nickel and cadmium electrodes usually embody cadmium electrodes which are of substantially greater charge capacity than the nickel electrodes. These negative cadmium electrodes embody nickel screens having particles of nickel metal sintered thereto and have particles of electrochemically active cadmium hydroxide secured to the nickel substrates. When charged at room temperature, the batteries are charged to the capacity of the positive nickel electrodes. If the batteries are subjected to further charging, oxygen gas is evolved at the positive electrode due to the electrolysis of the aqueous battery electrolyte. However, this oxygen gas is continuously recombined at the negative cadmium electrode in the battery so that no excessive internal pressures are built up within the battery. The negative cadmium electrodes are never charged to their full capacity at room temperature.

However, it has been found that when these conventional batteries are charged at low temperature on the order of −40° C., excessive quantities of hydrogen gas are evolved within the battery due to the electrolysis of the aqueous battery electrolyte at the negative cadmium electrodes. The hydrogen gas evolution occurs when the batteries are charged to only a small part of their room temperature capacity. As the prior art batteries make no provision for recombining hydrogen gas in the batteries, the batteries cannot be adequately charged at low temperatures without risking permanent loss of electrolyte, the build-up of internal hydrogen pressures, and ultimate destruction of the batteries.

It is an object of this invention to provide novel and improved sealed batteries which are rechargeable at low temperatures; to provide such batteries which are rechargeable at low temperatures on the order of −40° C.; and to provide such batteries which are of simple and inexpensive construction.

It is a particular object of this invention to provide sealed nickel-cadmium batteries which are rechargeable at −40° C.; to provide improved cadmium electrodes for use in aqueous alkaline electrolytes in such batteries; to provide such improved cadmium electrodes which are of simple, durable and inexpensive construction; and to provide such cadmium electrodes which can be charged to substantially full capacity in aqueous alkaline electrolytes at low temperatures on the order of −40° C.

Briefly described, the sealed low-temperature rechargeable battery of this invention includes at least one negative cadmium electrode, at least one positive electrode such as a nickel oxide electrode, porous, electrically-insulating separator means disposed between the electrodes, a sealed casing enclosing the electrodes and separator means, an aqueous alkaline electrolyte forming electrolytic paths between the electrodes, and terminal means electrically-connected to the respective electrodes accessible from outside the casing, the cadmium electrode embodying a foraminous, electrically conductive cadmium or cadmium-plated substrate having electrochemically active particulate cadmium material secured to the substrate.

In this construction, the sealed battery of this invention is rechargeable at room temperature or low temperatures on the order of −40° C. without resulting in the evolution of any significant quantity of hydrogen gas within the battery. The battery is readily charged to substantially the full capacity of the battery at relatively high charge rates without developing harmful internal battery pressures. The battery can remain on continuous overcharge at room temperature or at −40° C. without significant hydrogen gas evolution occurring with the battery. Further, the battery and the cadmium electrode of this invention are comparable in simplicity, durability and cost to conventional sealed nickel-cadmium batteries.

Other objects, advantages and details of the battery and cadmium electrode of this invention, appear in the following detailed description of preferred embodiments of the invention, the description referring to the drawings in which.

Figure 1:
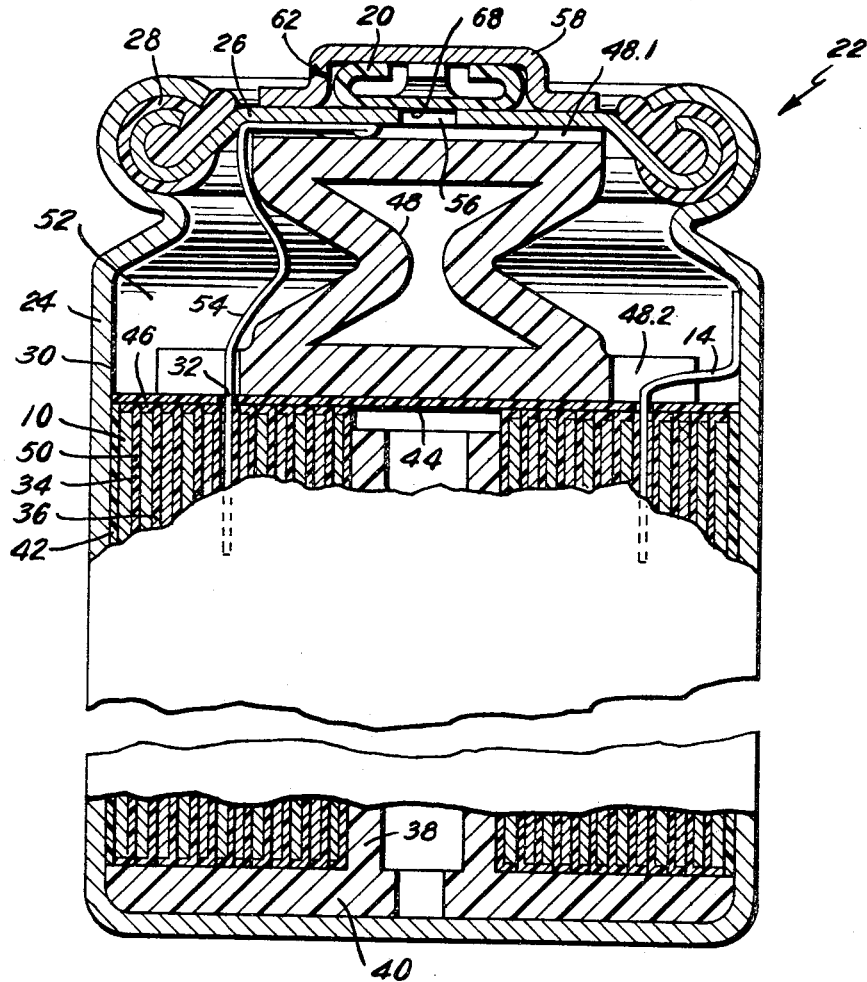
FIG. 1 is a section view along the vertical axis of the battery of this invention.

In conventional sealed nickel-cadmium batteries, the negative cadmium electrodes embody porous sintered nickel substrates which have electrochemically active cadmium or cadmium hydroxide particles secured to the substrates. When these batteries are charged at room temperature (21° C.), the cadmium hydroxide on the electrode is readily reduced to cadmium metal. For example, when conventional cadmium electrode is placed in 30 percent aqueous solution of potassium hydroxide with a counter electrode and a nickel oxide reference electrode and is charged at a rate equaling ⅕ the ampere-hour (c./5) capacity of the electrode, the electrode is readily charged without undesirable side effects. While being charged, the potential of the negative electrode relative to the nickel oxide reference electrode remains at approximately 1.300 volts until all of the cadmium hydroxide is reduced and the electrode is charged to full capacity as indicated by curve $a$ in FIG. 5. Thereafter, electrolysis of water occurs at the negative electrode and the aqueous constituent of the electrolyte is reduced to form hydrogen gas and hydroxyl ions. This evolution of hydrogen gas is accompanied by a sharp rise in electrode potential as indicated by curve $a$.

If this cadmium electrode were to be charged to full capacity in a conventional battery, any additional charging of the battery would cause evolution of hydrogen gas at the electrode. However, in a conventional battery, the negative cadmium electrode has a charge capacity substantially greater than that of the positive nickel electrode, and the battery is charged only to the capacity of the positive electrode. The negative electrode, therefore, never reaches its full charge capacity. As a result no hydrogen gas is evolved at the negative electrode during charging at room temperature.

On the other hand, when these same conventional batteries are charged at lower temperatures on the order of —40° C., a substantial lowering of the Faradaic efficiency for reduction of the cadmium hydroxide is noted. Any increase in the current density or charging rate for the battery at the lower temperatures causes further lowering of this reduction efficiency. For example, when the described conventional cadmium electrode is charged at a temperature of —40° C. under conditions which are otherwise as above described, hydrogen gas is evolved at the electrode when the electrode has been charged to only a small part of its capacity as indicated by curve b in FIG. 5. The potential of the negative electrode relative to the reference electrode is approximately 1.400 volts when the initial hydrogen-free charging of the conventional electrode occurs. Then, as indicated in curve b, the early evolution of hydrogen gas at the electrode is accompanied by a sharp rise in electrode potential. Thereafter the electrode can be charged to a greater part of its capacity at the higher electrode potential, but this further charging is accompanied by evolution of substantial quantities of hydrogen gas. Because of this excessive hydrogen gas evolution, conventional nickel-cadmium batteries cannot be adequately charged at low temperatures on the order of —40° C.

It is believed that the electrochemical reaction occurring at the cadmium electrode during battery discharge actually results in the formation of two types of cadmium hydroxide which are herein designated as active cadmium hydroxide and less active cadmium hydroxide. While both forms of cadmium hydroxide are subsequently reducible to reform cadmium metal at approximately the same electrode potential during charging at room temperature, the two materials react quite differently at low temperatures. That is, although the active form of cadmium hydroxide is reducible at the same electrode potential whether the reduction occurs at room temperature or at lower temperatures, the reduction of the less active cadmium material requires a significantly higher potential at the low temperatures.

Specifically, the active form of the cadmium hydroxide is reduced when the potential of the electrode relative to a standard hydrogen electrode is about 809 millivolts. At low temperature, the less active material is reduced only at an electrode potential of about 830 millivolts. It is believed that the active form of cadmium hydroxide has less perfect crystallinity and is therefore more easily reduced than the less active, more perfectly crystalline, material. As the electrolysis of the aqueous electrolyte occurs at the conventional cadmium electrode when the electrode potential is about 829 millivolts, relative to the standard hydroxide electrode, full charging of the electrode results in simultaneous reduction of the less active cadmium material and the evolution of hydrogen gas at the electrode.

It is believed that the hydrogen overpotential characteristics of cadmium and cadmium hydroxide in the conventional electrode is substantially higher than the hydrogen overpotential characteristics of the nickel substrate in the electrode. For this reason it is believed that the early evolution of hydrogen gas occurring during charging of the electrode at low temperatures occurs primarily at the sites where the nickel substrate is exposed to the electrolyte.

Figure 3:
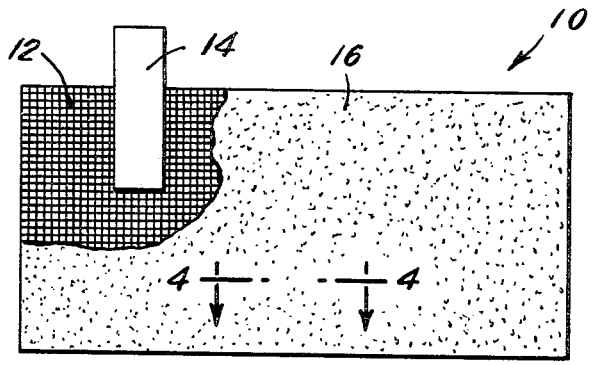
FIG. 3 is a side elevation view of the cadmium electrode of this invention prior to assembly in the battery of FIG. 1.
Figure 4:
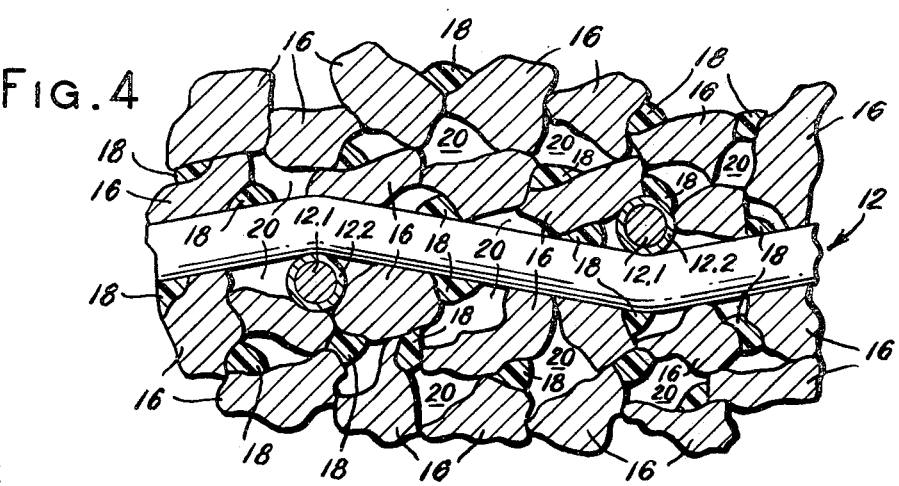
FIG. 4 is a section view, to greatly enlarged scale, along line 4—4 of FIG. 3.

In accordance with this invention, as shown in FIGS. 3 and 4, a novel and improved negative cadmium electrode 10 is constructed in which there are no nickel sites exposed to the electrolyte. In this electrode, a foraminous, electrically-conductive metallic screen 12, preferably comprising a # 4/0 nickel screen 12.1 having a cadmium or cadmium alloy plating or coating 12.2 thereon, forms an electrode substrate. This substrate has high electrical conductivity, strength and durability of conventional electrode substrates but has only cadmium or cadmium alloy surfaces exposed. Alternately, the screen 12 may comprise a woven cadmium or cadmium alloy wire screen or the like within the scope of this invention. An electrode lead 14, preferably comprising an electrically-conductive strip of cadmium or cadmium plated nickel is then welded, soldered or otherwise secured in electrically-conductive relation to the substrate 12.

An electrochemically active particulate cadmium material 16 is then secured to the substrate to form a porous electrode structure. For example, cadmium oxide particles 16 of about 10 micron size are preferably secured in electrically-conductive relation to each other and to the substrate 12 by means of fused binder particles 18 of a plastic material such as polyethylene, tetrafluoroethylene or the like, the binder particles preferably being of a size on the order of 0.5 micron. In this arrangement, the electrode is filled with pores 20 and has a very high degree of porosity. For example, the cadmium oxide particles are blended with particles of polyethylene binder material in a small quantity of deionized water to form a paste. The paste is then spread on the electrode substrate, is dried and compacted under pressures on the order of 5000 pounds per square inch, and is heated to a temperature of about 300° F. for fusing the binder material to the cadmium oxide particles and substrate to form a porous electrode structure. Process features for forming battery electrodes are further described in the copending application entitled "Battery Electrode and Method of Making," filed in the names of Popat and Johnson on or about Mar. 1, 1967, which application is now owned by the assignee of the present application. This cadmium oxide electrode structure is then placed in a 30% aqueous solution of potassium hydroxide together with a suitable counter electrode. With the cadmium oxide and counter electrodes connected as cathode and anode respectively, the cadmium oxide electrode is then fully charged at a 250 milliamp rate, the cadmium oxide particles being converted to cadmium metal particles to form the electrode 10 of this invention.

Figure 5:
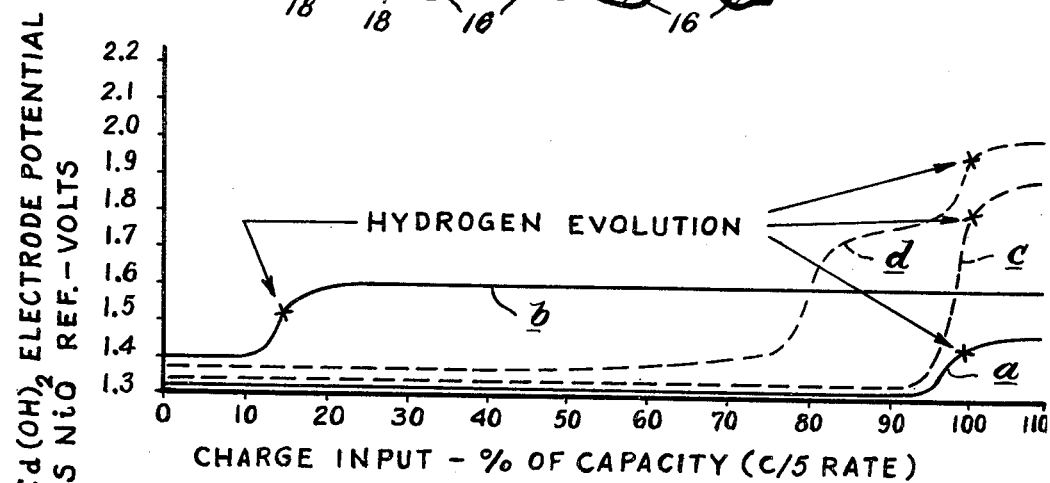
FIG. 5 is a graph illustrating characteristics of the cadmium electrode of this invention as compared to the cadmium electrode of the prior art.

When the improved cadmium electrode 10 is discharged and subsequently recharged at room temperature with a counter electrode and a nickel oxide reference electrode in a 30% aqueous solution of potassium hydroxide at a rate equaling ⅕ of the ampere-hour capacity of the electrode, the electrode is readily charged to substantially full capacity without the evolution of hydrogen gas as indicated by curve c in FIG. 5. This hydrogen-free charging of the electrode occurs when the electrode potential relative to the reference electrode is about 1.300 volt. Only when the electrode is charged to substantially full capacity, is hydrogen gas evolved in the electrode, this gas evolution being accompanied by a sharp rise in electrode potential as indicated by curve c.

In addition, the electrode 10 of this invention has the marked advantage that it can be charged to substantially full capacity without evolving hydrogen gas even when the electrode is charged at temperatures on the order of —40° C. For example, when the electrode 10 is charged under conditions as above described, the electrode is readily charged to full capacity before hydrogen is evolved as indicated by curve d in FIG. 5. In charging the electrode 10 at this low temperature, the electrode is charged to part of its capacity at an electrode potential of about 1.300 volt. During this charging stage, it is believed that the active cadmium hydroxide on the electrode is reduced to form cadmium metal. The electrode potential then sharply increases to approximately 1.750 volt and the electrode is further charged to substantially its full capacity. During this second charging step, it is believed that the less active cadmium hydroxide on the electrode is reduced to form cadmium metal. Only when the electrode is substantially fully charged, is hydrogen gas evolved at the electrode as shown by curve d.

Figure 2:
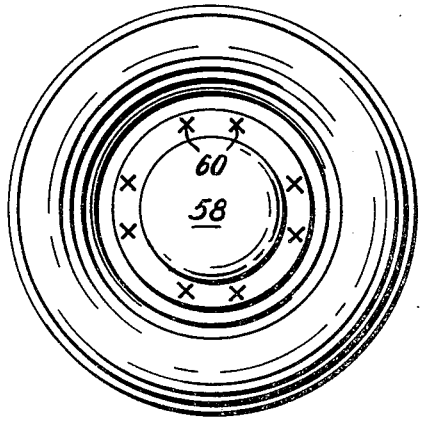
FIG. 2 is a plan view, to smaller scale, of the battery of FIG. 1.

In accordance with this invention, the novel and improved cadmium electrode 10 is incorporated in a sealed battery 22 as illustrated in FIGS. 1 and 2. Referring to FIGS. 1 and 2, this battery is shown to include a casing 24 of nickel, steel or other suitably strong, rigid and electrically conductive material, a cover 26 preferably formed of the same material as the casing, and a sealing ring 28 of a plastic material such as polyethylene or the like which is preferably fused to the cover and casing for sealing the battery. In a preferred embodiment of this invention, the casing 24 is provided with a coating 30 of cadmium metal or cadmium metal alloy.

Within the battery, a porous positive nickel electrode 32 and a porous negative cadmium electrode 10 as provided by this invention are interleaved with the porous battery separators 34 and 36, preferably formed of a polyamide felt or other porous electrical insulating material, and are wound upon a cylindrical plastic mandrel 38 having a base 40 in a jelly-roll like configuration so that the electrodes are arranged in spaced relation to each other. In accordance with this invention, the electrode 10 is provided with a charge capacity substantially greater than the charge capacity of the negative nickel electrode 32. Preferably the capacity of the cadmium electrode 10 is twice as great as that of the nickel electrode. An electrically insulating sleeve 42 is fitted around the electrodes between the electrodes and the casing, an electrically insulating disc 44 is disposed on top of the electrodes, the sleeve 42 and disc 44 preferably being formed of the same material as the separators 34 and 36. Separators 34 and 36 are preferably of greater width than the electrodes 32 and 10 so that, when wound on the mandrel 38, the separators are folded over the edges of the electrodes as illustrated at 46 in FIG. 1. A spacer 48 preferaby formed of a plastic material such as polyethylene is fitted between the disc 44 and cover 26 for preventing axial movement of the electrode.

In a preferred construction, a limited amount of alkaline electrolyte, preferably comprising a 30% aqueous solution of potassium hydroxide is disposed within the battery 22 so that the electrolyte forms a thin electrolyte film on the surfaces of the electrodes 32 and 10 and is absorbed within the pores of the separators 34 and 36 to form electrolytic paths between the electrodes. In this way, using a limited amount of electrolyte, a gas space 52 is formed within the battery over the electrolyte 50.

The porous nickel electrode 32 incorporated in the battery 22 of this invention preferably comprises an electrically-conductive, foraminous, substrate having electrochemically active particulate material such as β-nickelic hydroxide secured to the substrate and having an electrode lead 54 (see FIG. 1) secured to the electrode. As such a nickel electrode is more fully described in the above identified application of Popat and Johnson, the nickel electrode is not further described herein. It will be understood that the nickel electrode 32 embodied in the battery 22 can be of any conventional construction.

As illustrated in FIG. 1, the electrode lead 54 of the positive nickel electrode 32 is welded, soldered or otherwise secured in electrically conductive relation to the cover 26, the cover then serving as a terminal means for the nickel electrode. Similarly, the electrode lead 14 from the negative cadmium electrode 10 of this invention has one end portion welded, soldered or otherwise secured in electrically conductive relation to the casing 24, the casing then serving as a terminal means for the cadmium electrode. In a preferred battery construction, the cover 26 is provided with an aperture 56 over which a terminal cap 58 is secured by welds 60, the welds being spaced as indicated in FIG. 2 so that the cap is not in fluidtight relation to the cover. In this arrangement, a spider-like member 62 has a valve portion 68 which is held against the rim of the cover aperture 56 by action of the resilient member legs 70 for normally sealing the battery 22, the member legs being adapted to flex in response to excessive gas pressures within the battery for venting gas from the battery through the cover aperture 56 and under the terminal cap 58. The spider member 62 is preferably formed of a plastic material such as polyethylene and the spacer 48 is preferably provided with gas passages 48.1 for facilitating venting of gas from within the battery. In a preferred battery construction, the member 62 is adapted to vent gas from the battery when internal battery pressures exceed about 100 pounds per square inch. The spacer 48 is also preferably provided with notches 48.2 permitting the electrode leads to be extended through the disc 44 to their respective terminal means.

This novel and improved battery construction incorporating the improved electrode 10 of this invention, and preferably including a smooth cadmium or cadmium alloy coating 30 within the battery casing, has the marked advantage that it can be charged to substantially full capacity of the positive battery electrode at either room temperature or at low temperatures on the order of −40° C. without evolving any significant quantity of hydrogen gas at the negative battery electrode. If the battery is left on continuous overcharge, so that oxygen gas is evolved at the positive electrode, this oxygen gas is continuously recombined at the negative cadium electrode in the manner of conventional nickel-cadmium batteries. However, the negative cadmium electrode of the battery never reaches full charge capacity, and therefore never evolves hydrogen gas. Further, the battery 22 is characterized by simplicity, durability and low cost comparable to conventional nickel-cadmium batteries which cannot be charged at low temperatures such as −40° C.

Although particular embodiments of the battery and electrode of this invention have been described by way of illustration, it should be understood that the invention includes all modifications and equivalents of the disclosed embodiments which fall within the scope of the appended claims.

We claim:

1. A sealed nickel-cadmium battery rechargeable at low temperatures on the order of −40° C. comprising a porous positive nickel electrode, a negative cadmium electrode, porous electrically-insulating separator means disposed between said electrodes, a sealed casing enclosing said electrodes and separator means, terminal means electrically connected to said respective electrodes accessible from outside said casing, and an aqueous alkaline electrolyte forming electrolytic paths between said electrodes, said cadmium electrode embodying a foraminous, electrically conductive substrate having all of its surfaces formed of cadmium, embodying an electrochemically active cadmium material in particulate form, and organic binder means securing said active material in electrically conductive relation to said substrate to form a porous electrode structure in which all exposed metal surfaces are formed of cadimum.

2. A sealed nickel-cadmium battery rechargeable at low temperatures on the order of −40° C. comprising an electrically conductive metallic casing having an open end, an electrically conductive metallic cover attached in electrically insulating relation to said open casing end for sealing said casing, a porous positive nickel electrode of selected charge capacity, a negative cadmium electrode of relatively greater charge capacity, porous electrically insulating separator means disposed between said electrodes, said electrodes and separator means being disposed within said casing, lead means electrically connecting said respective electrodes to said casing and cover so that said casing and cover serve as terminal means for said electrodes, and an aqueous alkaline electrolyte forming electrolytic paths between said electrodes, said cadmium electrode embodying a foraminous, electrically-conductive substrate all surfaces of which are formed of cadmium, embodying an electrochemically active cadmium material in particulate form, and embodying discrete particles of organic binder materials for securing said active material in electrically conductive relation to said substrate to form a porous electrode structure in which all exposed metal surfaces are formed of cadmium.

3. A battery as set forth in claim 2 wherein said cadmium electrode substarte comprises a metallic wire mesh formed of a material selected from a group consisting of cadmium and cadmium metal alloys.

4. A battery as set forth in claim 2 wherein said cadmium electrode substrate comprises a nickel screen having a coating thereon formed of a material selected from the group of cadmium and cadmium metal alloys.

5. A battery as set forth in claim 2 wherein said casing has an inner coating of a cadmium material.

6. A cadmium battery electrode rechargeable in a battery at low temperatures on the order of −40° C. comprising a foraminous, electrically-conductive substrate all surfaces of which are formed of cadmium, an electrochemically active cadmium material in particulate form, and organic binder means securing said active material in electrically conductive relation to said substrate to form a porous electrode structure in which all exposed metal surfaces are formed of cadmium.

7. A cadmium battery electrode as set forth in claim 6 wherein said organic binder means comprise discrete particles of organic binder material.

8. A cadmium battery electrode as set forth in claim 7 wherein said cadmium electrode substrate comprises a metallic wire mesh formed of a material selected from the group consisting of cadmium and cadmium metal alloys.

9. A battery electrode as set forth in claim 7 wherein said cadmium electrode substrate comprises a nickel screen having a coating thereon formed of a material selected from the group consisting of cadmium and cadmium metal alloys.

References Cited

UNITED STATES PATENTS

| | | | |
|---|---|---|---|
| 2,994,729 | 8/1961 | Solomon et al. | 136—24 |
| 2,662,928 | 12/1953 | Brennan | 136—24 |
| 2,903,496 | 9/1959 | Vogt | 136—24 |
| 3,081,367 | 3/1963 | Field et al. | 136—24 |
| 3,132,053 | 5/1964 | Krebs | 136—120 |
| 3,174,878 | 3/1965 | Peters | 136—24 |
| 3,174,879 | 3/1965 | Stanimirovitch | 136—6 |
| 3,227,583 | 1/1966 | Carlisle | 136—6 |
| 3,326,721 | 6/1967 | Henderson et al. | 136—24 |
| 3,305,397 | 2/1967 | Stark | 136—120 |

WINSTON A. DOUGLAS, Primary Examiner

C. F. LEFEVOUR, Assistant Examiner

U.S. Cl. X.R.

136—24, 120